Sept. 18, 1956     A. J. DAVENPORT     2,763,284
LEVEL CONTROL

Filed Aug. 4, 1954                                 3 Sheets-Sheet 1

Arnold J. Davenport
INVENTOR.

Sept. 18, 1956   A. J. DAVENPORT   2,763,284
LEVEL CONTROL
Filed Aug. 4, 1954   3 Sheets-Sheet 2

Arnold J. Davenport
INVENTOR.

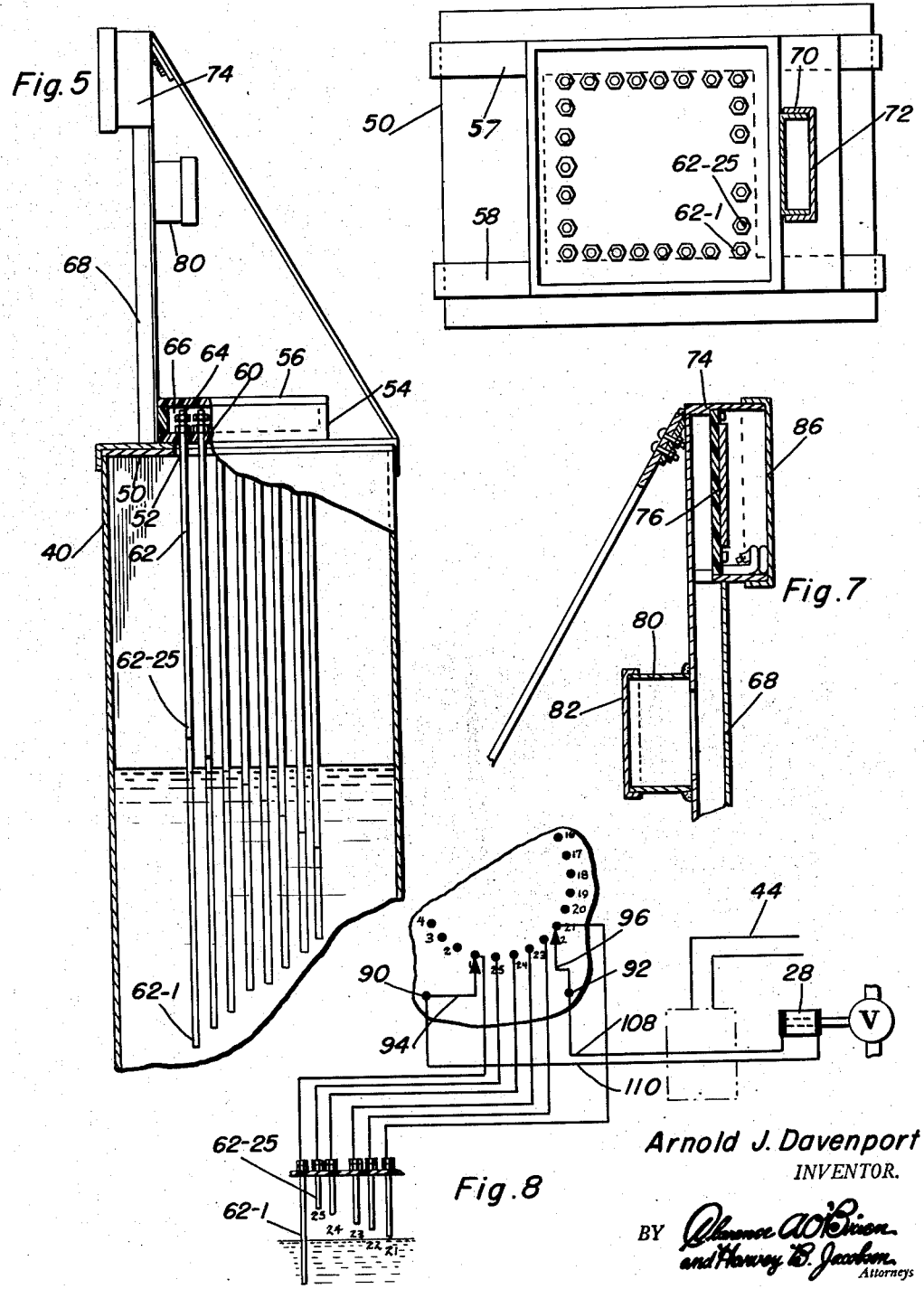

United States Patent Office 2,763,284
Patented Sept. 18, 1956

2,763,284

LEVEL CONTROL

Arnold J. Davenport, White Haven, Pa., assignor to Wilmot Engineering Company, Hazleton, Pa.

Application August 4, 1954, Serial No. 447,837

3 Claims. (Cl. 137—392)

This invention relates to a level control and particularly to a device for controlling the level of water in a flotation separator.

In the operation of a flotation separator it is customary to provide an agitator tank into which a raw material may be supplied and in which the material may be agitated in a reverse stream of water with the lighter material being cast out and the heavier material falling to the bottom of the chamber. The bottom of the chamber is preferably provided with a butterfly valve to control the accumulation of the heavier materials and water is supplied through the discharge chamber below the butterfly valve and upwardly through the butterfly valve and into the agitator chamber. The heavy material being periodically dumped into the discharge chamber and removed through an angulated chute to a receiver. Thus, as the density of the material on the butterfly valve increases the height of the water in the chute will increase and after a predetermined increase thereof the butterfly valve will be opened to dump the accummulated heavy materials which will permit the water to flow upwardly through the space so that the level of the chute is decreased. After a predetermined decrease in the water level it is desirable to set the butterfly valve and again repeat the cycle.

Heretofore considerable difficulty has been encountered in properly maintaining the water level within predetermined levels. The present invention provides a complete control system for operating the valves in response to variation in the water level in the discharge chute and particularly to a selector electrode system for properly responding to the difference in levels in the chute.

In the construction according to the invention the butterfly valve and the inlet valve are controlled by means of a valve controller of the electrically energized type which will be supplied with current from a control panel to which is connected a pair of control conductors which are selectively connected to a plurality of elongated electrodes mounted in an electrode box with the electrodes being of progressively shorter length and means for preventing short circuits or improper operation of the device together with means for selectively connecting the control devices to any one of the electrodes. It is accordingly an object of the invention to provide an improved water level control.

It is a further object of the invention to provide an improved water level detector.

It is a further object of the invention to provide a water level detector having a plurality of rigidly mounted electrodes and means for selectively connecting thereto.

A further object of the invention is to provide a selector electrode system which is substantially impervious to moisture.

Other objects and many of the attendant advantages of the present invention will be apparent from the following detailed description taken in conjunction with the accompanying drawing in which:

Figure 5 is an enlarged side elevation taken substantially opposite to the arrangement shown in Figure 3;

Figure 6 is an enlarged top plan view of the electrode mounting chamber with the top removed;

Figure 7 is a further enlarged vertical sectional elevation through the jack board and the splicing box showing the arrangement and construction there;

Figure 8 is a schematic wiring diagram showing the operation of the device.

Figure 1:
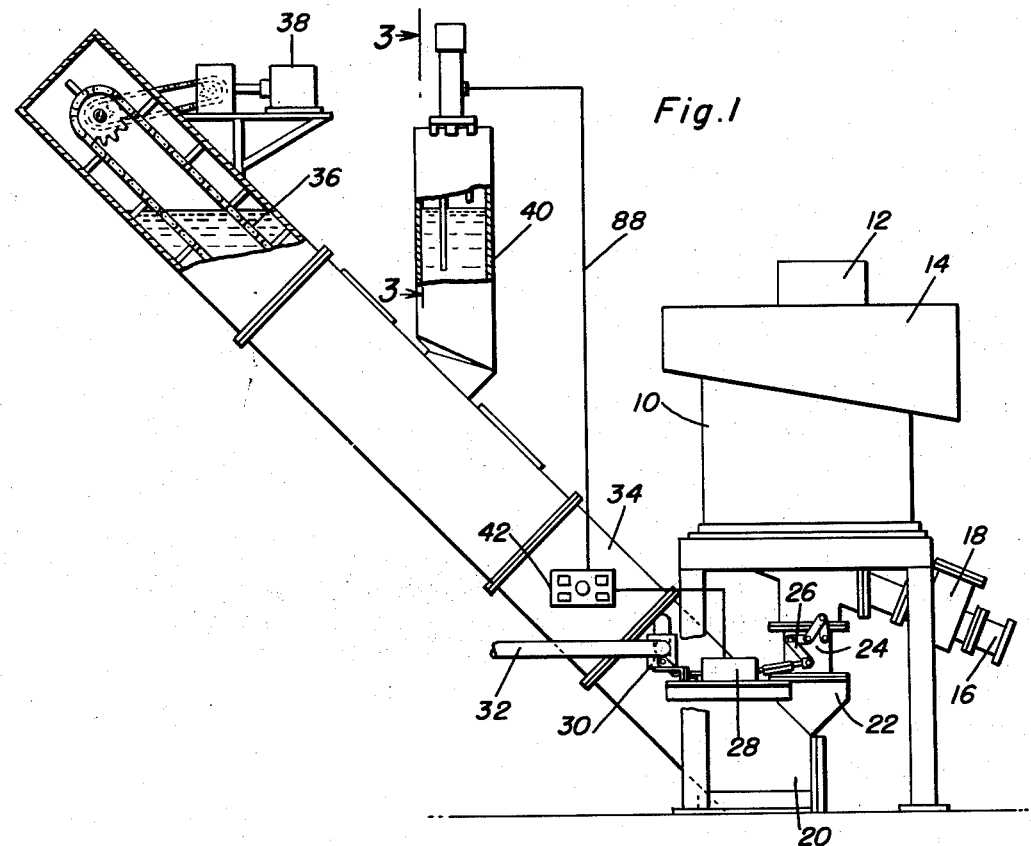
Figure 1 is a side elevation of a flotation separator embodying the level control according to the invention.

In the exemplary embodiment according to the invention an agitator tank is provided with an intake box 12 through which raw material may be introduced into an agitator chamber and provided with an overflow chute 14 through which the lighter materials and the overflow water will be discharged from the device. The circulating water will be introduced through a conduit 16 having a check valve 18 so that the water discharged through the top of the agitator tank 10 will be recirculated therefrom, and as is well known, an agitator, not shown, will be provided in the tank 10 to agitate the materials therein. Preferably a heavy material receiving chamber 20 is provided below the agitator tank 10 and a chute 22 extends from the bottom of the agitator tank to the discharge receiver 20 and a butterfly valve 24 operated by means of a linkage 26 controlled by a suitable valve operator 28, is interposed between the chute 22 and chamber 20. The valve operator will likewise control a quick opening water valve 30 in a water supply line 32 which communicates with the interior of a discharge chute 34 connected to the interior of the discharge receiving chamber 20 and in which is preferably provided a conveyor 36. The conveyor 36 being operated by a motor 38 connected to the conveyor 36 in any suitable manner.

A water level control system comprises a control tank 40 mounted on and communicating with the chute 34 so that the water level in the tank 40 will be substantially identical to the water level in the chute 34. The water level selector, presently to be described, is mounted in the control tank and control conductors are connected therefrom to a control panel 42 which is operative in response to the liquid level in the tank 40 to connect the valve operating device 28 to an electrical supply circuit 44.

The level selector device comprises a cover 50 mounted on the top of the control tank 40 and having an aperture 52 therein. Placed on the cover 50 and covering the aperture 52 is a connecting box 54 having a cover 56. The connecting box 54 is spaced from the cover 50 by means of suitable spacer strips 57 and 58. The box 54 is provided with a plurality of apertures 60 into which electrodes 62 are firmly connected in substantially watertight connection. Preferably the material of the box 54 is of insulating waterproof material.

Figure 3:
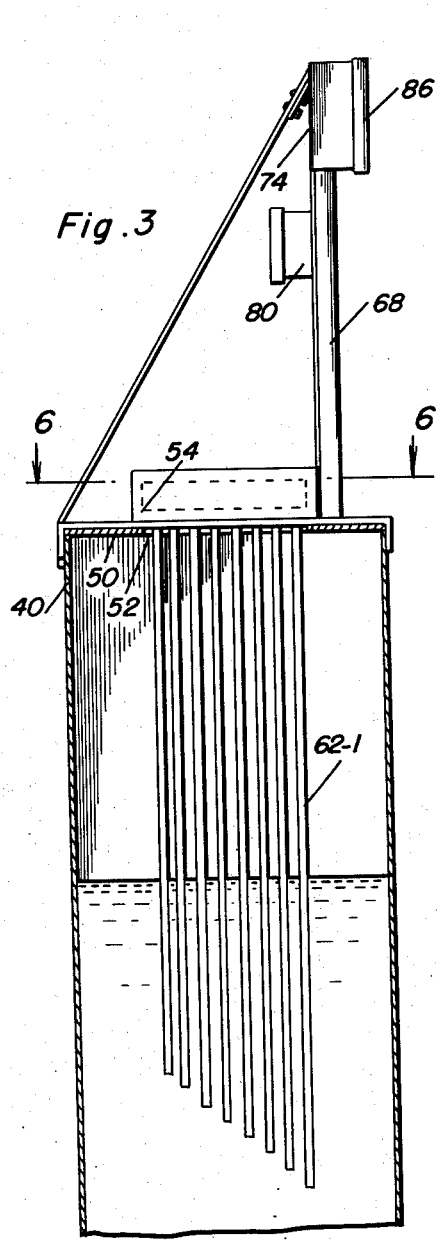
Figure 3 is an enlarged side view of the water level detector taken substantially on the plane indicated by the section line 3—3 of Figure 1.
Figure 4:
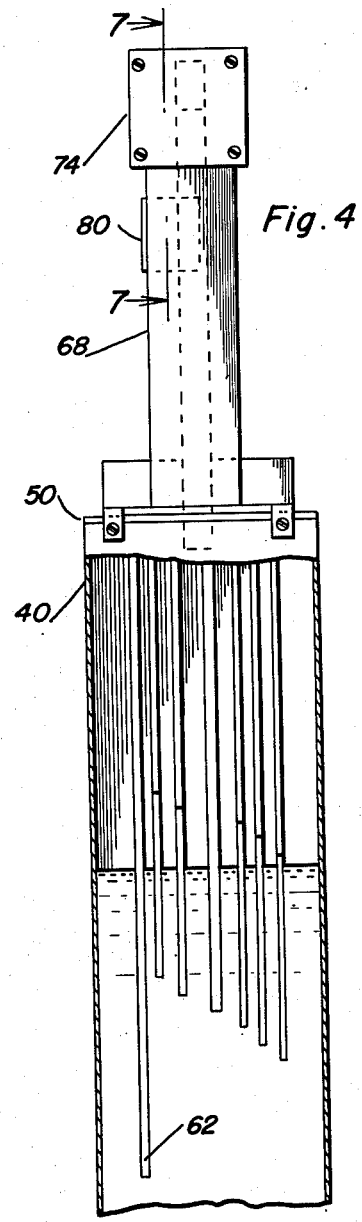
Figure 4 is an enlarged view substantially similar to Figure 3 but taken from the back of the device and having portions cut away and in section.

Any desired number of electrodes can obviously be used. The electrodes 62 are herein shown as 25 in number with the longest electrode being approximately 3½ feet long and designated as electrode $62_1$. The electrodes are arranged in a square formation as shown in Figure 6, the electrodes being spaced substantially evenly from each other and as shown in Figures 3, 4 and 5 the electrodes become progressively shorter from electrode $62_1$ to electrode $62_{25}$ so that it will be apparent that each higher number of electrode is shorter than the next lower number and longer than the next higher number. The electrodes 62 are provided with mounting heads 64 having connector nuts 66 thereon so that conductors may be readily connected thereto. After the conductors have been connected to the head 64 and the nuts properly secured the entire surface including the heads will be painted by a suitable insulating material to prevent accumulation of water in the box 54 or the short circuiting of the electrode heads by the accumulation of any water therein.

A conduit 68 is connected to the box 64 and is herein shown as being constructed of a pair of telescoping channels 70 and 72 preferably connected together in any suitable manner to provide a substantially fluid-tight conduit.

Figure 2:
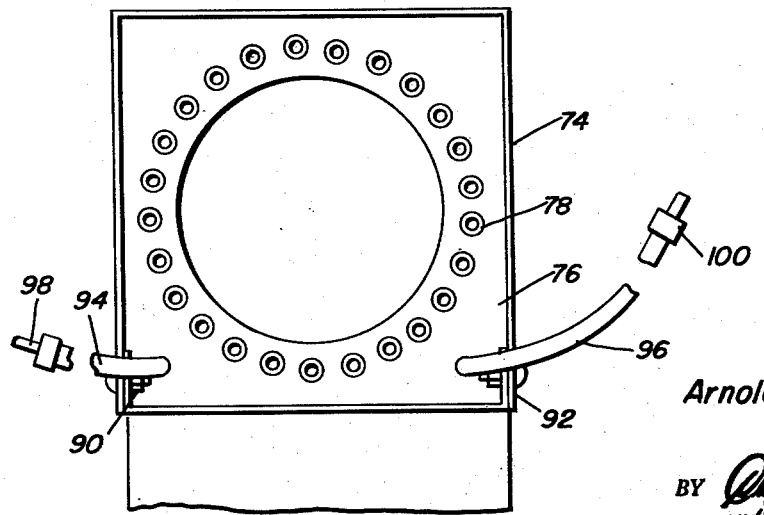
Figure 2 is an enlarged front elevation of a jack board with the front removed and showing the manner of selecting the desired electrode.

Conduit 68 is herein shown as extending upwardly from the box 54 but obviously could extend in any desired direction. An enclosure 74 is mounted at the opposite end of the conduit 68 and is shown in Figure 2 as provided with a jack board 76. The jack board 76 has a plurality of jacks 78 mounted in circular formation therein and corresponding in numbers to the electrodes 62.

A junction or splice box 80 is provided intermediate the ends of the conduit 68 and is provided with a removable cover 82. A portion of the conduit 68 is cut-out to provide communication between the splice box 80 and the interior of a conduit 68. The conductors attached to the ends of the electrodes 62 extend upwardly through the conduit 68 into the splice box 80 and conductors connected to the jacks 78 extend downwardly through the conduit into the splice box 80 where the conductors of the respective jacks and electrodes are connected together and preferably sealed by any suitable insulating and moisture proof compound. Obviously after the connections are made the entire conduit including the splice box 80 may be filled with insulating compound if desired.

A removable cover 86 is supplied for the enclosure 74 and a pair of control conductors carried in a cable 88 are introduced into the enclosure 74 by means of binding posts 90 and 92. Principal conductors 94 and 96 are supplied on the binding posts 90 and 92 respectively and plug terminals 98 and 100 are provided thereon. The plug terminals 98 and 100 being adapted to connect into a jack 78 to provide an electrical connection between the conductors and the elongated electrodes.

As shown in Figure 8 it will be apparent that each of the electrodes 62$_1$ to 62$_{25}$ are properly connected to the corresponding jacks likewise given sub numbers 1 to 25 so that the plugs 98 and 100 may be readily connected therewith. The first conductor 94 and plug 98 will always be connected to the rod longer than the rod connected to the plug 100 so that the proper operation of the device will always ensue. Any desired warning or interconnect means may be provided to secure such connection.

In the operation of the device, material and water will be circulated through the agitator chamber and water will be introduced through the conduit 32 and by means of the open valve 30. Thus as the heavier material accumulates on the butterfly valve 24 the water will rise upwardly in the chute 34 and in the tank 40 until such time as the level of the water in the tank 40 engages the shorter of the selected electrodes in which event a first conductor 108 and the cable 88 have current flowing therethrough to energize the operating device and the control panel 42 and cause operation of the valve operating device 28 to open the butterfly valve 24 and close the water supply 30. The operation of the control panel by the flow of current through the conductor 108 will cause a holding circuit to be established which will be broken when the water level is below or separates from the electrode 62 connected with a conductor 110. When this happens the valves are reversed with the valve 30 opening and the butterfly valve 24 closing. Obviously, the conveyor 36 will remove the heavy material from the collector chamber 20.

The various lengths of the electrodes 62 provide a means by which any desired density of material may be collected and by selecting the proper electrodes the variation in water level at each dump of the selected material can be varied at will and obviously may be held within very close limits.

For purpose of exemplification a particular embodiment of the invention has been shown and described according to the best present understanding thereof. However, it will be apparent to those skilled in the art that various changes and modifications may be in the construction and arrangement of the parts thereof without departing from the true spirit and scope of the invention.

What is claimed as new is as follows:

1. In a flotation separator system comprising an agitator tank, refuse discharge valve in the bottom of said tank, a discharge chamber below said valve, an angular discharge chute communicating with said discharge chamber, a water inlet valve operative to admit water into said chute, a liquid level control tank extending vertically from said discharge chute and in communication with said chute, and an automatically operating liquid level control means, said liquid level control means including a plurality of elongated electrodes extending downwardly into said control tank, said electrodes being progressively graduated in length for engagement by a predetermined level of water, a valve operator operatively connected to said valve, a valve opening circuit operatively connected to said valve operator, connector means for connecting said valve opening circuit to one of said electrodes, valve holding circuit operatively connected to said valve operator, means for selectively connecting said valve holding circuit to another of said electrodes, said opening circuit being energized by contact of the water in the control tank with the first selected electrode, said holding circuit being de-energized by separation of the water with the second electrode.

2. In a flotation separator system as set forth in claim 1 wherein said selector means includes a jack connected to each of said electrodes, a jack board, said jacks being arranged on said jack board, first and second control conductors selectively engageable in said jacks to connect said control conductors to said electrodes.

3. In a flotation separator system as set forth in claim 1 wherein said selector means includes a plurality of jacks each being electrically connected to one of said electrodes, first and second control conductors engageable in predetermined jacks, a sealed housing enclosing the top ends of said electrodes, a conduit extending from said sealed housing to said jacks, a splice box provided between said jacks and electrodes, and a sealed enclosure enclosing the jacks and control conductors therein.

References Cited in the file of this patent

UNITED STATES PATENTS

| | | |
|---|---|---|
| 1,831,898 | Wignall | Nov. 17, 1931 |
| 2,132,755 | Nichols | Oct. 11, 1938 |